US009189642B2

(12) United States Patent
Perlman

(10) Patent No.: US 9,189,642 B2
(45) Date of Patent: Nov. 17, 2015

(54) SAFE PROCESSING OF ON-DEMAND DELETE REQUESTS

(75) Inventor: Radia Joy Perlman, Sammamish, WA (US)

(73) Assignee: Oracle America, Inc., Redwood City, CA (US)

( * ) Notice: Subject to any disclaimer, the term of this patent is extended or adjusted under 35 U.S.C. 154(b) by 2362 days.

(21) Appl. No.: 11/724,520

(22) Filed: Mar. 14, 2007

(65) Prior Publication Data

US 2008/0228827 A1    Sep. 18, 2008

(51) Int. Cl.
*H04L 9/32* (2006.01)
*G06F 21/62* (2013.01)

(52) U.S. Cl.
CPC ........ *G06F 21/6218* (2013.01); *G06F 21/6209* (2013.01); *G06F 2221/2101* (2013.01); *G06F 2221/2143* (2013.01)

(58) Field of Classification Search
CPC .............................. H04L 9/3281; G06F 21/64
USPC ................ 707/200; 713/177; 726/2, 4, 17, 27
See application file for complete search history.

(56) References Cited

U.S. PATENT DOCUMENTS

| 6,134,660 | A | 10/2000 | Boneh et al. | |
| 6,363,480 | B1 | 3/2002 | Perlman | |
| 7,596,696 | B1 | 9/2009 | Perlman | |
| 2008/0098230 | A1* | 4/2008 | Kalibjian et al. | 713/176 |
| 2008/0183802 | A1* | 7/2008 | Gray et al. | 709/203 |

OTHER PUBLICATIONS

United States Patent and Trademark Office, Office Action for U.S. Appl. No. 11/214,958 mailed Dec. 19, 2008.
Publication: "A Revocable Backup System" by Boney and Lipton, In Proceedings 6th USENIX Security Conference, pp. 91-96, 1996.
United States Patent and Trademark Office, Notice of Allowance and Fee(s) Due for US. Appl. No. 11/214,958 mailed May 20, 2009.

* cited by examiner

*Primary Examiner* — Anthony Brown
(74) *Attorney, Agent, or Firm* — Brooks Kushman P.C.

(57) ABSTRACT

Methods and apparatus for safe processing of on-demand delete requests are disclosed. An item is stored in a storage entity that is associated with a trusted secure device. A delete request to delete the item is received at the trusted secure device. However, the trusted secure device does not yet delete the item from the storage entity. The trusted secure device creates an audit log of the delete request. The audit log specifies the item to be deleted and includes information about the delete request. The audit log is made available to an approval source. The approval source must grant approval in the form of an approval response in order for the item to be deleted. If the trusted secure device receives an approval response from the approval source, the item is deleted.

14 Claims, 7 Drawing Sheets

```
301 RECEIVE, AT A TRUSTED SECURE DEVICE, A DELETE REQUEST TO
DELETE AN ITEM, THE ITEM STORED IN A STORAGE ENTITY THAT IS
ASSOCIATED WITH A TRUSTED SECURE DEVICE
                    │
                    ▼
302 CREATE AN AUDIT LOG OF THE DELETE REQUEST, WHEREIN THE AUDIT
LOG SPECIFIES THE ITEM TO BE DELETED AND INCLUDES INFORMATION
ABOUT THE DELETE REQUEST, AND WHEREIN THE AUDIT LOG IS AVAILABLE
TO AN APPROVAL SOURCE
  ┌──────────────────────────────────────────────────────────────┐
  │ 304 CREATE AN AUDIT LOG OF THE DELETE REQUEST, WHEREIN THE   │
  │ AUDIT LOG SPECIFIES THE ITEM TO BE DELETED AND INCLUDES      │
  │ INFORMATION ABOUT THE DELETE REQUEST, AND WHEREIN THE AUDIT  │
  │ LOG IS AVAILABLE TO A PLURALITY OF APPROVAL SOURCES          │
  └──────────────────────────────────────────────────────────────┘
                    │
                    ▼
303 IF THE TRUSTED SECURE DEVICE RECEIVES AN APPROVAL RESPONSE
FROM THE APPROVAL SOURCE, DELETE THE RETAINED KEY FROM THE
SECURE STORAGE AREA OF THE TRUSTED SECURE DEVICE
  ┌──────────────────────────────────────────────────────────────┐
  │ 305 IF THE TRUSTED SECURE DEVICE RECEIVES AN APPROVAL        │
  │ RESPONSE FROM A QUORUM OF THE PLURALITY OF APPROVAL SOURCES, │
  │ DELETE THE ITEM FROM THE STORAGE ENTITY OF THE TRUSTED       │
  │ SECURE DEVICE                                                │
  └──────────────────────────────────────────────────────────────┘
```

FIG. 3

SAFE PROCESSING OF ON-DEMAND DELETE REQUESTS

BACKGROUND

Assured deletion of a file guarantees that the data contained within the file is unrecoverable. The techniques used to preserve a file until it is no longer needed, such as the creation of backup copies of a file and the storage of those backup copies in multiple locations, makes assured deletion a complicated task. An alternative to having multiple backup copies of a file and then having to delete each backup copy of a file in all its varied storage locations is to encrypt the contents of the file with a key. As long as the key remains secret, the contents of the file remain secret, and the destruction of the key guarantees that the contents of the file cannot be recovered when the file is to undergo assured deletion.

However, the advantage granted by use of an encryption key also raises issues about access to the file. If the key is lost prematurely, while the data in the file is still useful and/or needed, and no backup copies of the key exist, then the data is lost. The obvious solution to this problem, creating backup copies of the key, results in the same issues that using an encryption key is supposed to avoid—namely, in order to have assured deletion of the file, the key and all of its backup copies stored in various locations must be destroyed.

One alternative to this is to use a device called an ephemerizer with public keys with expiration dates, and the ephemerizer deletes the private key at the expiration time. The file system may assure non-recoverability of files after their expiration date by encrypting files with an ephemerizer public key with the desired expiration date. Alternatively, the file system may encrypt files that all should expire at the same time with the same secret key, and store a backup of that secret key with an ephemerizer public key with that expiration date. To achieve the desired result despite ephemerizer failures, or ephemerizers that do not delete keys, files or keys may be encrypted with multiple ephemerizer public keys, such that they can be recovered with a quorum of ephemerizers.

On demand delete is a process in which the file system keeps a database of keys for all its files. An ephemerizer is utilized in order to allow backups of the key database while still allowing assured delete. The ephemerizer, or a quorum of ephemerizers, keeps at least two public keys at all times, the current public key, and the previous public key. The file system encrypts snapshots of the key database with the current public key. Periodically the ephemerizer(s) are told to destroy the previous public key, and generate a new key. The file system starts encrypting backups of the key database with the current public key, and backups encrypted with the old previous public key become unrecoverable. Typically, there is some method to ensure that only the authorized owner of the file system may recover the data in case of data loss. This may be done with an extra level of encryption of the backup of the key database using a system administrator secret, or the ephemerizer(s) may have some means of authenticating the file system when asked to decrypt, such as being installed with a cryptographic key with which to authenticate decryption requests.

A key manager maintains two copies of an ephemerizer's public key, the current public key and the previous public key. The previous public key was used to encrypt a previous version of the key table(K), which itself was used to encrypted a previous version of the key table of the file system. The current public key is as above. When the previous version of the key table of the file system is no longer needed, the previous public key of the ephemerizer(s) may be thrown away. The current public key then becomes the previous public key, and a new public key is created and the encryption process is followed as described above.

This process is described in greater detail in co-pending U.S. patent application Ser. No. 11/214,958, filed on Aug. 29, 2005, now U.S. Pat. No. 7,596,696, issued Sep. 29, 2009, entitled EFFICIENTLY MANAGING KEYS TO MAKE DATA PERMANENTLY UNREADABLE, the entire contents of which are hereby incorporated by reference.

SUMMARY

Conventional technologies for on-demand delete of encryption keys, such as those described above, suffer from a variety of deficiencies. In particular, because the file system manages the table or database of keys, if the file system is unknowingly compromised, then one or many keys may be corrupted, deleted, or otherwise lost. When all ephemerizer public keys that encrypted the last undamaged state of a key table are thrown away, the ability to recover the undamaged keys and access the files associated with those keys is lost. Of course, this also results in the loss of the data contained in the files associated with the lost keys. Further, the window of opportunity during which keys may be recovered is only as long as the amount of time the ephemerizers go between deleting their previous public keys.

Embodiments disclosed herein provide for safe on-demand deletion of files that is handled by a separate trusted secure device through an approval process. The device manages a storage entity, such as but not limited to a storage device, or in a particular example, a table of keys that if provided to a file system would allow a user to decrypt the files controlled by the file system that are associated with those keys (re-word structure—"are assoc" with "files"). Thus, if an item such as a key that is managed by the device is permanently deleted, it is impossible to recover the item, and in the case of an encryption key, it is impossible to decrypt the file associated with that key. When an item is going to be deleted for any reason, legitimate (e.g., a command received from a system administrator) or otherwise (e.g., a virus causes a delete command to be issued for random files), a delete request must be sent to the separate trusted secure device to delete the item. Though the trusted secure device receives the delete request, the trusted secure device does not yet delete the item specified in the delete request. Instead, the device retains the item until an approval process has been completed. This approval process requires that one or more trusted sources, such as a system administrator, review the circumstances of the delete request. In other words, one or more trusted sources audit the delete request, by examining information such as which user was identified as making the delete request and when the delete request was made. The trusted source(s) may then verify this information by, for example, speaking with the user who is identified as having made the delete request. If the trusted source is able to confirm that the delete request is legitimate and that the item should actually be deleted, the trusted source communicates an approval response to the device. Upon receiving the approval response, the device actually deletes the item. Thus, if a delete request is illegitimate, such as being the result of a virus or other malicious program, the trusted source should be able to ascertain this, and will not grant approval for the item to be deleted.

More particularly, in an embodiment of the invention, there is provided a method of safely deleting an item from a storage entity, wherein the storage entity is associated with a trusted secure device. The method includes receiving, at the trusted secure device, a delete request to delete an item; creating an audit log of the delete request, wherein the audit log specifies the item to be deleted and includes information about the delete request, and wherein the audit log is available to an approval source; and if the trusted secure device receives an approval response from the approval source, deleting the item from the storage entity of the trusted secure device.

In a related embodiment, the audit log may be available to a plurality of approval sources, and deleting may include deleting the item from the storage entity of the trusted secure device if the trusted secure device receives an approval response from a quorum of the plurality of approval sources. In another related embodiment, the method may include confirming the validity of the approval response prior to deleting the item if the trusted secure device receives an approval response from an approval source. In still another related embodiment, the method may include notifying an approval source that an audit log has been created.

In yet still another related embodiment, the method may include transmitting an approval request for an approval response to an approval source, wherein the approval request identifies the item specified in the delete request. In a further related embodiment, transmitting may include transmitting an approval request for an approval response to an approval source, wherein the approval request includes the audit log.

In still yet another related embodiment, the method may include receiving an approval response, wherein the approval response comprises an electronically signed document, corresponding to a delete request, which identifies the approval source and the item to be deleted.

In another embodiment there is provided a computer program product stored on computer readable medium to safely delete an item from a storage entity, wherein the storage entity is associated with a trusted secure device. The computer program product includes computer program code for receiving, at the trusted secure device, a delete request to delete an item; computer program code for creating an audit log of the delete request, wherein the audit log specifies the item to be deleted and includes information about the delete request, and wherein the audit log is available to an approval source; and if the trusted secure device receives an approval response from the approval source, computer program code for deleting the item from the storage entity of the trusted secure device.

In another embodiment, there is provided a trusted secure device that includes a communications interface, a storage device, and a controller. The storage device stores one or more items. The controller is configured to, upon receiving a delete request to delete an item via the communications interface, create an audit log of the delete request that is stored in the storage device, wherein the audit log specifies the item to be deleted and includes information about the delete request, and wherein the audit log is available to an approval source; and if an approval response is received from the approval source, delete the item from the storage device.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein may be employed in computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the trusted secure device needs the approval of a plurality of approval sources before a key identified in a delete request may be deleted.

DETAILED DESCRIPTION

Embodiments disclosed herein include a trusted secure device that provides safe processing of on-demand deletions of one or more items. The trusted secure device manages the items, such as keys that encrypt a file system's files. When a request that one or more of those items be deleted is made, the trusted secure device does not delete anything yet. Rather, the trusted secure device creates an audit log including information about the delete request(s) and the item(s) to be deleted. This audit log is made available to one or more approval sources, who need to approve the delete request(s). The trusted secure device does not delete the key until it receives the appropriate approval. The appropriate approval is not granted by the approval source(s) until the source(s) has (have) verified that the delete request is legitimate.

Note that, as used throughout this specification and claims, the word "delete" and any variation thereon (such as but not limited to deletes, deleting, deleted, and so forth) is used in a way that expands upon the conventional definition of delete, as understood by one of ordinary skill in the art. Used herein, "delete" (or any variation thereof, as described above), may include not only deletion in the conventional sense, but may also include situations where an original of something stored in a storage device is overwritten, such that some value or datum is still present in that location in the storage device, and perhaps is still pointed to or otherwise referenced, but it is changed from the original, such that the original is no longer available.

Figure 1:
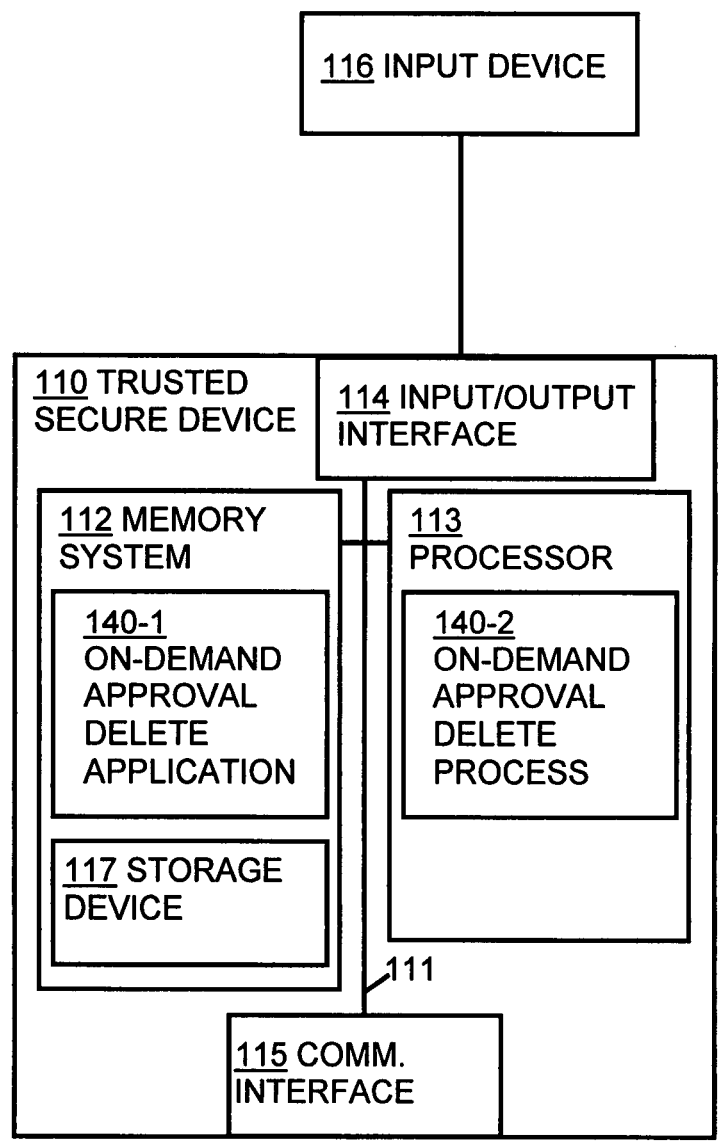
FIG. 1 shows a high-level block diagram of a trusted secure device according to one embodiment disclosed herein.

FIG. 1 is a block diagram illustrating an example architecture of a trusted secure device 110 that executes, runs, interprets, operates or otherwise performs an on-demand approval delete application 140-1 and process 140-2. The trusted secure device 110 may be any type of computerized device such as but not limited to a personal computer, workstation, portable computing device, console, laptop, network terminal or the like. As shown in this example, the trusted secure device 110 includes an interconnection mechanism 111 such as a data bus or other circuitry that couples a memory system 112, a processor 113, and a communications interface 115. The trusted secure device 110 may include an input/output interface 114 through which an input device 116 (e.g., one or more user/developer controlled devices such as a pointing device, keyboard, mouse, etc.) allows a user to provide commands to the trusted secure device 110. The communications interface 115 enables the trusted secure device 110 to communicate with other devices, such as but not limited to other computers. The memory system may include one or more storage devices 117 (only one is shown in FIG. 1).

The memory system 112 is any type of computer readable medium and in this example is encoded with an on-demand approval delete application 140-1. The on-demand approval delete application 140-1 may be embodied as software code such as data and/or logic instructions (e.g., code stored in the memory or on another computer readable medium such as a removable disk) that supports processing functionality according to different embodiments described herein. During operation of the trusted secure device 110, the processor 113 accesses the memory system 112 via the interconnection mechanism 111 in order to launch, run, execute, interpret or otherwise perform the logic instructions of the on-demand approval delete application 140-1. Execution of the on-demand approval delete application 140-1 in this manner produces processing functionality in an on-demand approval delete process 140-2. In other words, the on-demand approval delete process 140-2 represents one or more portions of runtime instances of the on-demand approval delete application 140-1 (or the entire application 140-1) performing or executing within or upon the processor 113 in the trusted secure device 110 at runtime.

A number of flowcharts illustrating embodiments of the invention are shown in FIGS. 2-5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
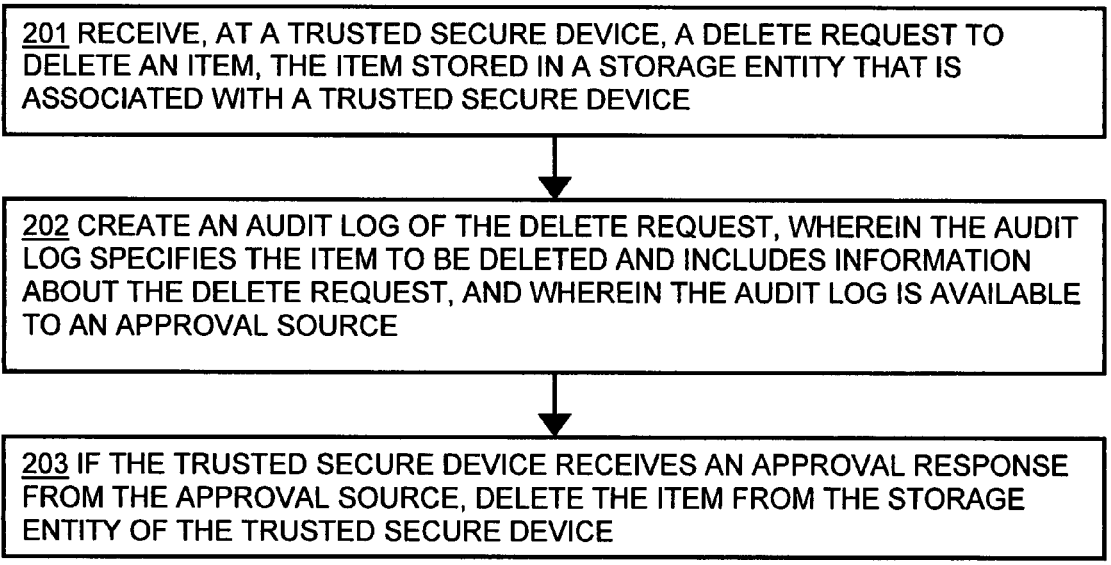
FIG. 2 illustrates a flowchart of a procedure performed by the system of FIG. 1 when the trusted secure device receives a delete request for which approval is needed.

More specifically, FIGS. 2-7 illustrate flowcharts of procedures performed by the trusted secure device when executing the on-demand approval delete application 140-1 as the on-demand approval delete process 140-2. In FIG. 2, when an item, such as but not limited to a key associated with a file in a file system, is to be deleted for any reason, that must be communicated to the trusted secure device 110. The trusted secure device 110 receives a delete request to delete an item stored in the trusted secure device 110, step 201. The item is stored within a storage entity that is associated with the trusted secure device 110, such as the memory system 112. Note that the storage entity may be part of the trusted secure device 110, as is the memory system 112, but alternatively may be separate from the trusted secure device 110 and accessed by the trusted secure device 110 in any conventional manner. If the item is an encryption key, the request may be made by the file system the key is associated with. A delete request originates at a source, such as but not limited to an authorized user logged on to a computer in communication with the trusted secure device 110. The source of the delete request need not be an actual authorized user; for example, if malicious software has access to a computer in communication with the trusted secure device 110, the malicious software may have the computer generate a delete request that appears to have originated from an authorized user, even if that user is not currently logged into the computer. Similarly, certain non-malicious software may legitimately send a delete request to the trusted secure device 110 to delete an item on an automatic schedule without an authorized user being logged on when the delete request is made. In this situation, the source of the delete request is the non-malicious software.

Other requests of the trusted secure device 110, such as but not limited to accessing one or more items stored in the memory system 112 and adding one or more items to be stored in the memory system 112, may be made. Though the trusted secure device 110 is able to receive and process any number of delete requests, the deletion of an item may be considered to be a rare event. Thus, if the trusted secure device 110 receives a large number of delete requests to delete a large number of items in a short period of time, this event may be flagged as a potential warning.

The on-demand approval delete application 140-1, executing as the on-demand approval delete process 140-2 on the trusted secure device 110, may respond to the delete request in any number of ways. For example, the on-demand approval delete process 140-2 may respond with a message that the item has been deleted. Alternatively, the on-demand approval delete process 140-2 may respond with a message that the item has been deleted, but that the deletion is not yet final and the item may still be retrieved. Alternatively, the on-demand approval delete process 140-2 may respond with a message that the item may be deleted upon review of the delete request. The on-demand approval delete process 140-2 may transmit such a message from the communications interface 115 of the trusted secure device 110. This message may be relayed to the source via the computer from which the delete request was received. In some situations, as far as the computer and the source know, the item has been deleted. Thus, if the delete request originated as a result of malicious software, such software believes the item identified in that delete request to have been deleted. In other situations, the computer and the source may know that the item has not yet been deleted or has been deleted but may still be retrieved.

However, the on-demand approval delete process 140-2 does not actually delete the item at this time. In actuality, the on-demand approval delete process 140-2 retains the item identified in the delete request. The item may be retained in a particular storage area of the trusted secure device 110 that is associated with the memory system 112. Such a storage area may be a separate storage unit within the memory system 112, or may be a separate partition or section of the memory that forms the memory system 112. Alternatively, the storage area may be a storage device that is separate from the memory system 112. Due to the nature of the trusted secure device 110, access to the memory system 112 itself, or any other storage devices, may be limited or unavailable altogether, to facilitate security.

The on-demand approval delete process 140-2 next creates an audit log of the delete request, step 202. The audit log specifies the item to be deleted and includes information about the delete request. Information contained within in the audit log may include, but is not limited to, any one or more of the following: the identity of the source of the delete request, which may include log in information for the user to whom the delete request is attributed to; the location from which the delete request was received, such as the computer from which the trusted secure device 110 received the delete request; the time at which the delete request was made; additional information concerning the delete request provided by the source of the delete request, such as a text note describing the circumstances of the delete request; and any other information that may be pertinent or useful to an approval source in attempting to verify the legitimacy of the delete request.

Whatever its form, the audit log is available to an approval source. The approval source may be, but is not limited to, an authorized user of the file system who has been given approval authority, such as a system administrator or other high-level user. The determination of who qualifies as an approval source may be left to the organization or other unit that uses one or more trusted secure devices 110, or alternatively may be decided in advance by whoever implements one or more trusted secure devices 110 for an organization. As another alternative, an approval source may be an application or other equivalent device that is configured to review audit logs and respond appropriately. Approval sources and how they may access the audit log, and in response, create and transmit approval response, are discussed in greater detail below.

If the trusted secure device 110 receives an approval response from the approval source, the on-demand approval delete process 140-2 deletes the item from the storage entity of the trusted secure device 110, step 203. Thus, the on-demand approval delete process 140-2 does not delete an item until the trusted secure device 110 receives an approval response from the approval source. If no approval is received, the item remains in the memory system 112 or other storage device.

Any provided approval response may be subject to a check on the validity of the approval response, as described below, or any other verification technique, such as but not limited to verifying that the contents of the approval response have not changed between when an approval source transmitted his/her approval response and when the trusted secure device 110 received it.

The on-demand approval delete process 140-2 may be configured to automatically return an item for which a delete request has been received that has been in the memory system 112 for a period of time if the trusted secure device 110 does not receive an approval response within that period of time or another period of time. Similarly, the on-demand approval delete process 140-2 may be configured to provide an alert or other warning to an approval source or to another source with sufficient authority that no approval response has been received within a period of time. The on-demand approval delete process 140-2 may transmit such an alert or warning using the same type of transmission as used for transmitting an approval request, as is described in greater detail below. Alternatively, the on-demand approval delete process 140-2 may use a different method of transmitting the alert or warning to ensure that the alert or warning is received. This situation presumes that there may be an error in the transmission medium used to send an approval request or in the ability of the approval source to receive an approval request via that transmission medium. The on-demand approval delete process 140-2 uses an alternative method of transmitting the alert or warning to avoid running into the same problem if such a problem exists. The transmission of the alert or warning may also be through a mechanism on the trusted secure device 10 itself, such as but not limited to a blinking warning light, audible noise, or other type of alert than would be easily noticed by anyone in the vicinity of the trusted secure device 110. In response to the alert or warning, of if the delete request has been determined to be illegitimate or cannot be determined to be legitimate, an approval source or other source with appropriate authority may access the trusted secure device 110 directly or remotely and instruct the on-demand approval delete process 140-2 to ignore the delete request for an item. These instructions may also have the on-demand approval delete process 140-2 send a message about this change. Such a message may be sent either immediately or after a period of time has passed, depending on whether or not any problems have been determined and/or corrected with the source of the delete request. For example, if an approval source believes the delete request was generated by malicious software, by instructing the on-demand approval delete process 140-2 to send a message that the item is again available, the approval source may be able to test the hardware and/or software thought to be infected. In such a situation, if a delete request for the same item is again received by the trusted secure device, and the approval source cannot verify that this delete request is legitimate, the approval source may use information about the delete request to help correct the problem(s) present in the affected hardware and/or software.

FIG. 3 illustrates a flowchart where the on-demand approval delete process 140-2 makes the audit log available to a plurality of approval sources. The trusted secure device 110 must then receive approval responses from one, all, or a defined quorum of the plurality of approval sources before the on-demand approval delete process 140-2 will delete an item. The trusted secure device 110 receives a delete request to delete an item stored in the trusted secure device 110, step 301. The item is stored within a storage entity that is associated with the trusted secure device 110, such as the memory system 112. The on-demand approval delete application 140-1, executing as the on-demand approval delete process 140-2 on the trusted secure device 110, may respond to the delete request with a message, as described above. However, the on-demand approval delete process 140-2 does not actually delete the item at this time. In actuality, the on-demand approval delete process 140-2 retains the item identified in the delete request.

The on-demand approval delete process 140-2 next creates an audit log of the delete request, step 302. The audit log specifies the item to be deleted and includes information about the delete request. Whatever its form, the audit log is available to an approval source, and in this instance is available to a plurality of approval sources, step 304.

If the trusted secure device 110 receives an approval response from the approval source, the on-demand approval delete process 140-2 deletes the item from the storage entity of the trusted secure device 110, step 303. In this case, if the trusted secure device 110 receives an approval response from a quorum of the plurality of approval sources, the on-demand approval delete process 140-2 deletes the item from the storage entity of the trusted secure device 110, step 305. Though a number of approval sources exist, only some quorum, or smaller number of the total number of approval sources, must actually successfully provide an approval response in order for the on-demand approval delete process 140-2 to delete an item. The quorum required by the on-demand approval delete process 140-2 may be defined in any way. For example, the quorum required may be a certain defined number out of the plurality of approval sources. Alternatively, the quorum may be a defined percentage of the plurality of approval sources. The quorum required by the on-demand approval delete process 140-2 may be adjusted according to the requirements of the users of a trusted secure device 110. When the trusted secure device 110 receives the appropriate number of proper approval responses, the on-demand approval delete process 140-2 deletes the item. Any approval responses received after this may be logged by the on-demand approval delete process 140-2 if desired, or may be ignored.

Alternatively, the on-demand approval delete process 140-2 might require that the quorum comprise each of the plurality of approval sources to provide an approval response. This configuration may be useful, for example, in a smaller organization where the number of approval sources is small or otherwise limited, and a quorum defined as a percentage, for example, might require only one approval source to provide an approval response before an item is deleted.

Figure 4:
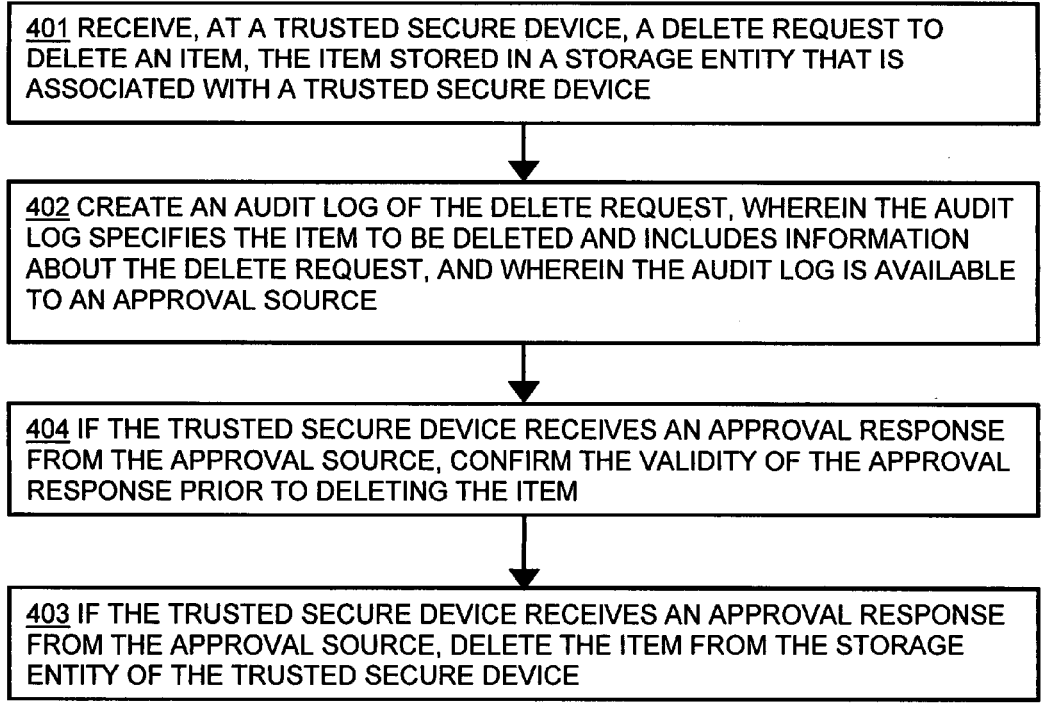
FIG. 4 illustrates a flowchart of a procedure performed by the system of FIG. 1 when the trusted secure device confirms the validity of an approval response prior to deleting an item.

FIG. 4 illustrates a flowchart where the on-demand approval delete process 140-2 confirms the validity of an approval response prior to deleting an item. The trusted secure device 110 receives a delete request to delete an item stored in a storage entity of the trusted secure device 110, step 401. The on-demand approval delete application 140-1, executing as the on-demand approval delete process 140-2 on the trusted secure device 110, may respond to the receipt of the delete request with a message, as described above. However, the on-demand approval delete process 140-2 does not delete the item yet. The on-demand approval delete process 140-2 next creates an audit log of the delete request, step 402. The audit log specifies the item to be deleted and includes information about the delete request, and the audit log is available to an approval source, as described herein.

If the trusted secure device 110 receives an approval response from the approval source, the on-demand approval delete process 140-2 confirms the validity of the approval response prior to deleting the item, step 405. The on-demand approval delete process 140-2 may confirm the validity of the approval response in a number of ways. For example, the audit log created by the on-demand approval delete process 140-2 may include a particular code or other identifier unique to each audit log. The approval source may be required to provide this code along with an approval response, such that the on-demand approval delete process 140-2 will not accept an approval response, and thus will not delete an item, if the approval response does not include the code. Alternatively, as described in greater detail below, an approval response may be required to include other information that is known only by the on-demand approval delete process 140-2 and is made known to an approval source along with the audit log.

Another alternative is that the on-demand approval delete process 140-2 may validate the approval response by confirming the identity of the approval source that allegedly generated the approval response. For example, an approval response may include the log in information of the approval source identified by the approval response, or may include an identifier of the approval source that may only be generated by the approval source having successfully logged in to respond. The on-demand approval delete process 140-2 would then need to maintain or have access to a list of all such identifiers to compare the received identifier to. The approval response may include a smart card identifier or other identifier that is particular to only the approval source. The approval response may include a random identifier that is one of a number of possible identifiers stored within the trusted secure device 110 known only to approval sources. The approval source may include a certain code within a field of the approval response.

Alternatively, if an approval request is transmitted by the trusted secure device 110, as described below, the on-demand approval delete process 140-2 may configure the approval request such that only an approval source is able to access the approval request, and the approval source is not able to do so without first providing proper identification to the approval request, using any of the methods described above or any other appropriate method.

After the on-demand approval delete process 140-2 confirms the validity of the approval response, as the trusted secure device 110 has received an approval response from the approval source, the on-demand approval delete process 140-2 deletes the item from the storage entity of the trusted secure device 110, step 403.

Figure 5:
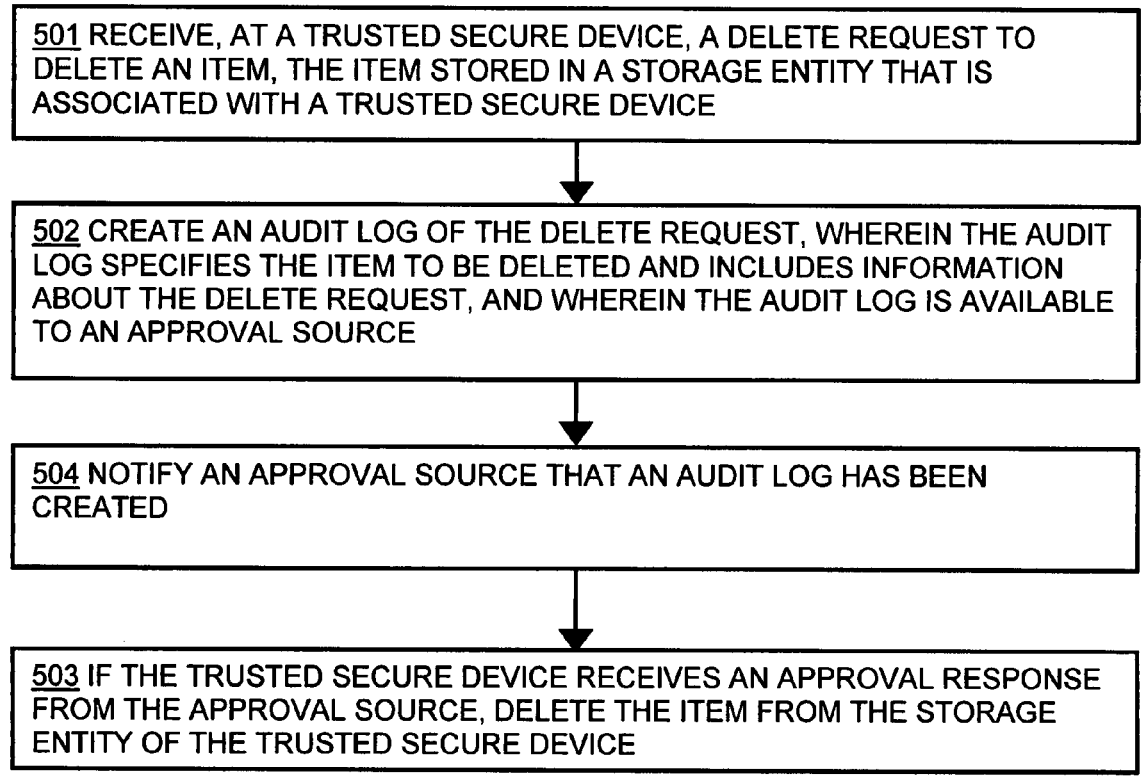
FIG. 5 illustrates a flowchart of a procedure performed by the system of FIG. 1 when the trusted secure device notifies an approval source that an audit log has been created.

FIG. 5 illustrates a flowchart where the on-demand approval delete process 140-2 notifies an approval source that an audit log has been created. The trusted secure device 110 receives a delete request to delete an item stored in the trusted secure device 110, step 501. The item is stored within a storage entity that is associated with the trusted secure device 110, such as the memory system 112. The on-demand approval delete application 140-1, executing as the on-demand approval delete process 140-2 on the trusted secure device 110, may respond to the delete request with a message. However, the on-demand approval delete process 140-2 does not actually delete the item at this time. In actuality, the on-demand approval delete process 140-2 retains the item identified in the delete request. The on-demand approval delete process 140-2 next creates an audit log of the delete request, step 502. The audit log specifies the item to be deleted and includes information about the delete request. Whatever its form, the audit log is available to an approval source.

The on-demand approval delete process 140-2 then notifies an approval source that an audit log has been created, step 504. The on-demand approval delete process 140-2 may notify more than one approval source, such as a plurality of approval sources, even if only one approval response is needed to permit the deletion of the item specified in the delete request. The on-demand approval delete process 140-2 may notify an approval source in any of a number of ways. The on-demand approval delete process 140-2 may transmit a notification message via a wired connection or a wireless connection through the communications interface 115 of the trusted secure device 110. The on-demand approval delete process 140-2 may use an e-mail message, an SMS (so-called 'text') message, or any other type of message capable of being transmitted, such as a computerized voice recording sent to the cellular phone, telephone, or other voice-reception capable device or destination of the approval source. If the trusted secure device 110 receives multiple delete requests in a particular period of time, and thus on-demand approval delete process 140-2 creates multiple audit logs, the on-demand approval delete process 140-2 may combine what would otherwise be a number of notifications into a single notification delivered through any method described herein. In other words, the on-demand approval delete process 140-2 may notify an approval source or sources of the creation of multiple audit logs in a single message.

Alternatively, the on-demand approval delete process 140-2 may notify an approval source of the creation of an audit log through a visual or audible signal generated directly from the trusted secure device 110. For example, the on-demand approval delete process 140-2 may activate a blinking light on the outside of the trusted secure device 110 that is visible to anyone in the vicinity of the trusted secure device 110, or an audible tone through a speaker in the trusted secure device 110 that is audible to anyone in the vicinity of the trusted secure device 110. A particular pattern of lights, sequences of tones, or combination of the two may be used to indicate that the on-demand approval delete process 140-2 created an audit log, and thus that a delete request requires approval. Further, particular patterns or sequences may indicate that the on-demand approval delete process 140-2 created multiple audit logs, corresponding to multiple delete requests.

However an approval source is notified of the creation of one (or more) audit log(s), the approval source may access the trusted secure device 110 directly, through for example but not limited to an input device 116, to create and/or provide an approval response. Alternatively, there may be an input mechanism (not shown) that is associated with the trusted secure device 110 that allows an approval source to view the audit log and then, after ascertaining that the delete request is legitimate, provide an approval response to the on-demand approval delete process 140-2. Other methods of providing an approval response are described in detail below. Having the on-demand approval delete process 140-2 notify an approval source through a mechanism located on or as part of the trusted secure device 110 itself may be particularly useful when approval sources are tasked with periodically checking the trusted secure device 110 to see if there are any pending delete requests. In this manner, an approval source or sources do not need to constantly be on call via an electronic device such as a cell phone, PDA, Blackberry or equivalent device, but may simply walk past the trusted secure device 110 whenever possible.

Finally, if the trusted secure device 110 receives an approval response from the approval source, the on-demand approval delete process 140-2 deletes the item from the storage entity of the trusted secure device 110, step 503.

Figure 6:
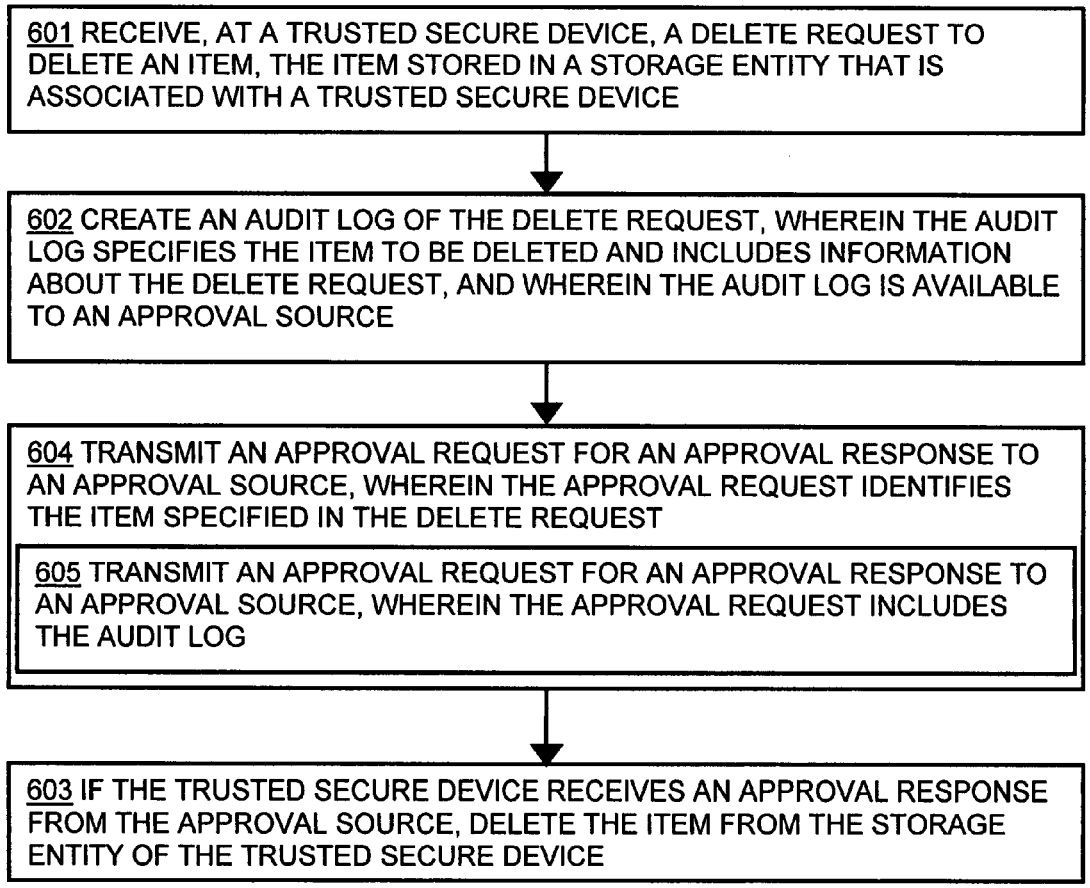
FIG. 6 illustrates a flowchart of a procedure performed by the system of FIG. 1 when the trusted secure device transmits an approval request for an approval response to an approval source.

FIG. 6 illustrates a flowchart where the on-demand approval delete process 140-2 transmits an approval request for an approval response to an approval source. The trusted secure device 110 receives a delete request to delete an item stored in the trusted secure device 110, step 601. The item is stored within a storage entity that is associated with the trusted secure device 110, such as the memory system 112. The on-demand approval delete application 140-1, executing as the on-demand approval delete process 140-2 on the trusted secure device 110, may respond to the delete request with a message. However, the on-demand approval delete process 140-2 does not actually delete the item at this time. In actuality, the on-demand approval delete process 140-2 retains the item identified in the delete request. The on-demand approval delete process 140-2 next creates an audit log of the delete request, step 602. The audit log specifies the item to be deleted and includes information about the delete request. Whatever its form, the audit log is available to an approval source.

The on-demand approval delete process 140-2 then transmits an approval request from the trusted secure device 110 to the approval source, step 604. The approval request identifies the item specified in the delete request, or alternatively, the approval request includes the audit log, step 605. As stated above with regards to notifying an approval source that an audit log has been created, the on-demand approval delete process 140-2 may transmit a plurality of approval requests to a plurality of approval sources even if only one approval response is needed to cause the on-demand approval delete process 140-2 to delete the item specified in the delete request.

The on-demand approval delete process 140-2 may transmit an approval request in any number of ways. The on-demand approval delete process 140-2 may transmit the approval request via a wired connection or a wireless connection through the communications interface 115 of the trusted secure device 110. The on-demand approval delete process 140-2 may use an e-mail message, an SMS (so-called 'text') message, or any other type of message capable of being transmitted, such as a computerized voice recording sent to the cellular phone, telephone, or other voice-reception capable device or destination of the approval source. Alternatively, the on-demand approval delete process 140-2 may indicate an approval request through a visual or audible signal directly from the trusted secure device 110. For example, the on-demand approval delete process 140-2 may activate a blinking light on the outside of the trusted secure device 110 that is visible to anyone in the vicinity of the trusted secure device 110, or an audible tone through a speaker in the trusted secure device 110 that is audible to anyone in the vicinity of the trusted secure device 110. A particular pattern of lights, sequences of tones, or combination of the two may be used to indicate that an approval request is being made. In this situation, the approval source may access the trusted secure device 110 directly, through for example but not limited to an input device, to create and/or provide an approval response.

The approval request transmitted by the on-demand approval delete process 140-2 may be a single approval request, of which the on-demand approval delete process 140-2 transmits multiple copies depending on the number of approval sources in the plurality, or the on-demand approval delete process 140-2 may transmit any number of specific approval requests to one or more of the approval sources in the plurality. For example, some approval sources may only be contactable via e-mail, while others may receive approval requests only through devices specifically designed to receive approval requests and capable of receiving nothing else. In such a situation, the on-demand approval delete process 140-2 would track the transmission preference of the approval sources in the plurality, and send approval requests via e-mail where appropriate and approval requests via another medium where appropriate. Similarly, the on-demand approval delete process 140-2 may craft each approval request according to other preferences of the approval source. For example, some approval sources may request that any approval request transmitted to them include certain information, while others may not. The on-demand approval delete process 140-2 may be configured to track these types of preferences and then will structure the approval request accordingly prior to transmitting it.

If the trusted secure device 110 receives an approval response from the approval source, the on-demand approval delete process 140-2 deletes the item from the storage entity of the trusted secure device 110, step 603.

Figure 7:
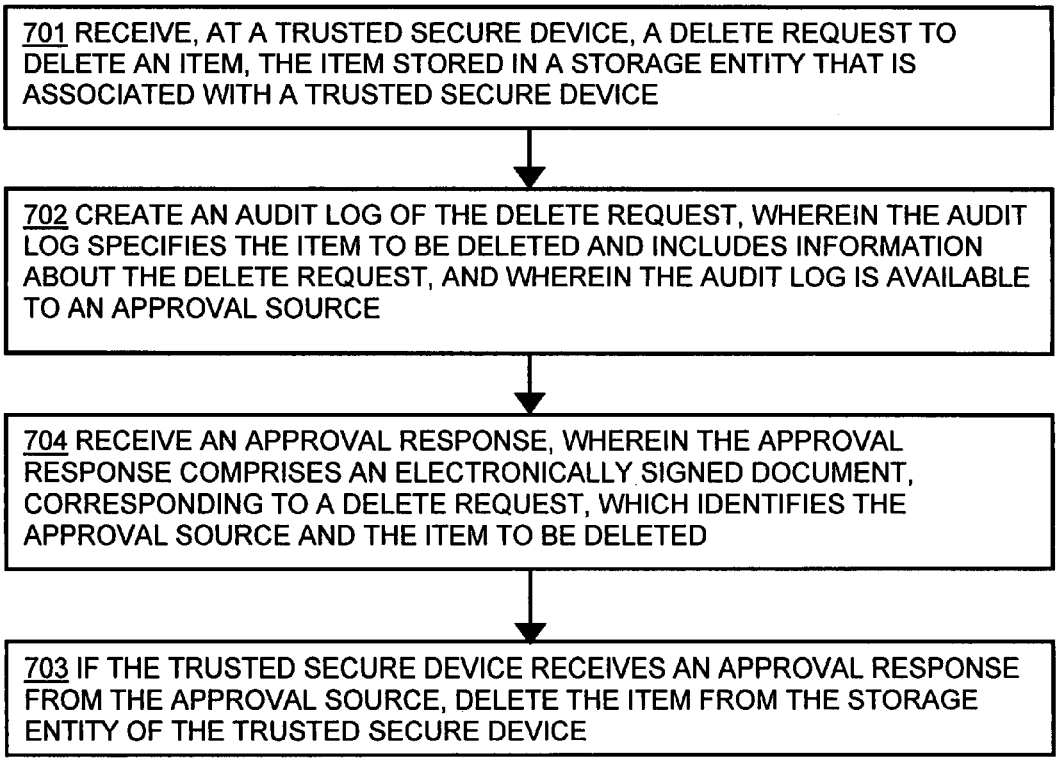
FIG. 7 illustrates a flowchart of a procedure performed by the system of FIG. 1 when the trusted secure device receives approval for a delete request in the form of an electronically signed document.

FIG. 7 illustrates a flowchart in which the on-demand approval delete process 140-2 receives a particular type of approval response. The trusted secure device 110 receives a delete request to delete an item stored in the trusted secure device 110, step 701. The item is stored within a storage entity that is associated with the trusted secure device 110, such as the memory system 112. The on-demand approval delete application 140-1, executing as the on-demand approval delete process 140-2 on the trusted secure device 110, may respond to the delete request with a message. However, the on-demand approval delete process 140-2 does not actually delete the item at this time. In actuality, the on-demand approval delete process 140-2 retains the item identified in the delete request. The on-demand approval delete process 140-2 next creates an audit log of the delete request, step 702. The audit log specifies the item to be deleted and includes information about the delete request. Whatever its form, the audit log is available to an approval source.

The on-demand approval delete process 140-2 then receives an approval response, step 704. The approval response may comprise an electronically signed document, corresponding to a delete request, which identifies the approval source and the item to be deleted. The approval response may match an approval request transmitted by the trusted secure device 110. The approval response may include the identity of the approval source and the identity of the item to be deleted. This would allow the on-demand approval delete process 140-2 to track which approval responses received by the trusted secure device 110 are for which delete requests, so that the on-demand approval delete process 140-2 does not mistakenly delete an item for which a proper approval response or responses has or have not yet been received.

The approval response may be sent by e-mail or other electronic transmission, either wired or wireless, from any type of computerized device (for example, but not limited to, a cellular telephone, PDA, personal computer, combination device, or a device created specifically to receive approval requests). Alternatively, an approval response may be made by the approval source accessing the trusted secure device 110, either directly through, for example, an input device or input mechanism (not shown) that is part of the trusted secure device 110, or remotely, and then accessing an approval form or other document stored within the trusted secure device 110 that is configured to communicate approval to the on-demand approval delete process 140-2. The on-demand approval delete process 140-2 may require that an approval source that accesses the trusted secure device 110 identify himself/herself prior to being able to grant approval. This may be done in any of the ways described above with regards to confirming the validity of an approval response, or by any other appropriate method of identification, such as logging in with a user name and password or logging in by use of a smart card.

Alternatively, the approval response may be part of the approval request. For example, the approval request transmitted by the on-demand approval delete process 140-2 as described above may be an e-mail to an approval source that includes a form. This form may not only identify the item specified by the delete request, as well as possibly including other pertinent information, such as the audit log as described above or an equivalent collection of information, but may also include a way for the approval source to indicate approval after reviewing the approval request. For example, the approval request may include a checkbox that, when checked by the approval source, causes an approval response to be a return e-mail transmitted to the trusted secure device 110, where the return e-mail includes all relevant information.

Finally, as the trusted secure device 110 has received an approval response from the approval source, as described above, the on-demand approval delete process 140-2 deletes the item from the storage entity of the trusted secure device 110, step 703.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation. Further, the device(s) or computer systems that integrate with the processor(s) may be arranged in any type of arrangement, such as but not limited to a distributed computer and/or processing architecture or a grid computer and/or processing architecture.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of safely deleting an item from a storage entity, wherein the storage entity is associated with a trusted secure device, the method comprising:
   receiving, at the trusted secure device, a delete request to delete an item;
   creating an audit log of the delete request, wherein the audit log specifies the item to be deleted and includes information about the delete request, and wherein the audit log is available to an approval source for review and approval of the delete request;
   if the trusted secure device receives an approval response from the approval source, confirming the validity of the approval response and deleting the item from the storage entity of the trusted secure device if the approval response is valid, and
   receiving an approval response, wherein the approval response comprises an electronically signed document, corresponding to a delete request, which identifies the approval source and the item to deleted.

2. The method of claim 1 wherein the audit log is available to a plurality of approval sources, and wherein deleting comprises:
   if the trusted secure device receives an approval response from a quorum of the plurality of approval sources, deleting the item from the storage device of the trusted secure device.

3. The method of claim 1 comprising:
   notifying an approval source that an audit log has been created.

4. The method of claim 1 comprising:
   transmitting an approval request for an approval response to an approval source, wherein the approval request identifies the item specified in the delete request.

5. The method of claim 4 wherein transmitting comprises:
   transmitting an approval request for an approval response to an approval source, wherein the approval request includes the audit log.

6. A non-transitory computer readable medium having computer program code stored thereon, to safely delete an item from a storage entity, wherein the storage entity is associated with a trusted secure device, the computer program code comprising:
   computer program code for receiving, at the trusted secure device, a delete request to delete an item;
   computer program code for creating an audit log of the delete request, wherein the audit log specifies the item to be deleted and includes information about the delete request, and wherein the audit log is available to an approval source for review and approval of the delete request;
   if the trusted secure device receives an approval response from the approval source, computer program code for confirming the validity of the approval response and deleting the item from the storage entity of the trusted secure device if the approval response is valid; and
   computer program code for receiving an approval response, wherein the approval response comprises an electronically signed document, corresponding to a delete request, which identifies the approval source and the item to be deleted.

7. The non-transitory computer readable medium of claim 6 wherein the audit log is available to a plurality of approval sources, and wherein computer program code for deleting comprises:
   if the trusted secure device receives an approval response from a quorum of the plurality of approval sources, computer program code for deleting the item from the storage device of the trusted secure device.

8. The non-transitory computer readable medium of claim 6 comprising:
   computer program code for notifying an approval source that an audit log has been created.

9. The non-transitory computer readable medium of claim 6 comprising:
   computer program code for transmitting an approval request for an approval response to an approval source, wherein the approval request includes the audit log.

10. A trusted secure device comprising:
a communications interface;
a storage device, wherein the storage device stores one or more items; and a controller configured to, upon receiving a delete request to delete an item via the communications interface, create an audit log of the delete request that is stored in the storage device, wherein the audit log specifies the item to be deleted and includes information about the delete request, and wherein the audit log is available to an approval source for review and approval of the delete request, and if an approval response is received from the approval source, confirm the validity of the approval response and delete the item from the storage device if the approval response is valid;
wherein the controller is configured to receive an approval response via the communications interface, wherein the approval response comprises an electronically signed document, corresponding to a delete request, which identifies the approval source and the item to be deleted.

11. The trusted secure device of claim 10 wherein the audit log is available to a plurality of approval sources, and wherein the controller is configured to, if an approval response is received from a quorum of the plurality of approval sources, delete the item from the storage device.

12. The trusted secure device of claim 10 wherein the controller is configured to notify an approval source that an audit log has been created.

13. The trusted secure device of claim 10 wherein the controller is configured to transmit an approval request for an approval response to an approval source, wherein the approval request identifies the item specified in the delete request.

14. The trusted secure device of claim 13 wherein the controller is configured to transmit an approval request for an approval response to an approval source, wherein the approval request includes the audit log.

* * * * *